(12) United States Patent
Chew et al.

(10) Patent No.: US 12,012,142 B2
(45) Date of Patent: Jun. 18, 2024

(54) STEER BY WIRE WITH MECHANICAL SAFETY BACKUP FOR A TRACK VEHICLE

(71) Applicant: ST ENGINEERING LAND SYSTEMS LTD, Singapore (SG)

(72) Inventors: Tze Meng Jensen Chew, Singapore (SG); Fu-Jun (Timmy) Low, Singapore (SG)

(73) Assignee: ST ENGINEERING LAND SYSTEMS LTD., Singapore (SG)

( * ) Notice: Subject to any disclaimer, the term of this patent is extended or adjusted under 35 U.S.C. 154(b) by 672 days.

(21) Appl. No.: 17/263,607

(22) PCT Filed: Aug. 3, 2018

(86) PCT No.: PCT/SG2018/050397
§ 371 (c)(1),
(2) Date: Jan. 27, 2021

(87) PCT Pub. No.: WO2020/027720
PCT Pub. Date: Feb. 6, 2020

(65) Prior Publication Data
US 2021/0291899 A1  Sep. 23, 2021

(51) Int. Cl.
*B62D 11/00* (2006.01)
*B62D 11/02* (2006.01)
*G05D 1/00* (2006.01)

(52) U.S. Cl.
CPC .......... *B62D 11/003* (2013.01); *B62D 11/005* (2013.01); *B62D 11/006* (2013.01); *B62D 11/02* (2013.01); *G05D 1/021* (2013.01)

(58) Field of Classification Search
CPC ... B62D 11/003; B62D 11/005; B62D 11/006; B62D 11/02; B62D 11/001;
(Continued)

(56) References Cited

U.S. PATENT DOCUMENTS 6,167,982 B1 * 1/2001 Dillon ................. B62D 11/183
180/419
6,419,043 B1 7/2002 Duval
(Continued)

FOREIGN PATENT DOCUMENTS

CN     105946968 A    9/2016
DE     4110148 A1    10/1991
(Continued)

OTHER PUBLICATIONS

Haggag et al.; Modeling, Control, and Validation of an Electro-Hydraulic Steer-by-Wire System for Articulated Vehicle Applications; IEEE/ASME Transactions on Mechatronics, vol. 10, No. 6, Dec. 2005; pp. 688-692 (Year: 2005).*
(Continued)

*Primary Examiner* — Michael J Zanelli
(74) *Attorney, Agent, or Firm* — CANTOR COLBURN LLP

(57) ABSTRACT

A hybrid hydro-mechanical/electronic steering system for a track vehicle, where the driver system can simultaneously use hydro-mechanical connections and electronic (steer by wire) connections to steer a track vehicle such as a tank, where safeguards for safety and reliability include seamless transition between electronic to hydro-mechanical control and vice versa, such that the system can be used in a single or double chassis track vehicle and is adaptable for autonomous driving.

16 Claims, 8 Drawing Sheets

(58) Field of Classification Search
CPC ...... B62D 11/183; B62D 5/091; B62D 5/001; B62D 12/00; G05D 1/021; G05D 5/091; G05D 5/001
See application file for complete search history.

(56) References Cited

U.S. PATENT DOCUMENTS

2010/0212994 A1    8/2010  Nicklin
2014/0074355 A1    3/2014  Kim

FOREIGN PATENT DOCUMENTS

| DE | 19929427 A1 | | 12/2000 | |
|---|---|---|---|---|
| DE | 19929428 A1 | * | 12/2000 | ............... B62D 5/06 |
| EP | 1088741 B1 | * | 2/2007 | ........... B62D 11/183 |
| WO | WO-2014182219 A1 | * | 11/2014 | ........... A01G 23/003 |
| WO | 2015175882 A1 | | 11/2015 | |

OTHER PUBLICATIONS

International Search Report for corresponding application PCT/SG2018/050397 filed Aug. 3, 2018; dated Oct. 3, 2018.
Written Opinion of the International Searching Authority for corresponding application PCT/SG2018/050397 filed Aug. 3, 2018; dated Oct. 3, 2018.
International Preliminary Report on Patentability for corresponding application PCT/SG2018/050397 filed Aug. 3, 2018; dated Feb. 28, 2019.

* cited by examiner

STEER BY WIRE WITH MECHANICAL SAFETY BACKUP FOR A TRACK VEHICLE

TECHNICAL FIELD

The present disclosure relates to a steering system for a track vehicle, and more specifically, to a hybrid steer by wire steering system with improved safety and operational capabilities for use on a single or double chassis track vehicle.

BACKGROUND

An autonomous vehicle is capable of monitoring its environment and navigating without human input. Benefits of autonomous vehicles include improved safety, improved efficiency, lower costs, decreased congestion and greater mobility for those who are unfit or not licensed to driver. Because a driver is not present to move mechanical linkages, autonomous vehicles operate through drive by wire technology.

Drive by wire ("DbW") technology is the use of electronic or electro-mechanical systems for performing vehicle functions that are conventionally achieved by mechanical linkages. This technology replaces the mechanical control systems with electronic control systems using electromechanical actuators and human-machine interfaces such as pedal and steering feel emulators. It is similar to the fly-by-wire systems used widely in the aviation industry.

Steer by Wire ("SbW") technology is a component of DbW technology. A SbW system can provide steering control of a vehicle without mechanical components and linkages between the steering wheel and the steering mechanism. A driver uses a steering wheel or other controls. Electric motors control the direction of wheels in an automobile. In a track vehicle, the rotation of tracks is controlled electronically by varying the output between a left and right track.

While SbW systems offer benefits to conventional steering systems, they also have shortcomings. An electronic or system failure can be catastrophic which leads many drivers to maintain a sense of apprehension or distrust in them. Further, the systems are potentially susceptible to being "hacked," and their control faulted or shut off, by either wired or wireless connections. Recent efforts have focused on improving the reliability and safety of SbW systems.

U.S. Pat. No. 5,637,927 describes a device for switching control of vehicle accessories between vehicle control stations. When a control switch is activated, a gating means connect the control inputs of the corresponding control station to the output connector and disconnects all other control stations. However, the disclosure has shortcomings. The system requires that each station utilize only electronic controls. Further, the system lacks safeguards necessary for safety and reliability.

U.S. Pat. No. 9,873,452 describes a drive by wire system with mechanical control for redundancy. In the event of an electrical failure, the mechanical steering can assume operation of the vehicle. The disclosure uses a mechanical gearbox including gears, a planetary mechanism, levers, hydraulic pumps and pistons for mechanical steering. While the system offers a backup to electronic steering, the method of transitioning to mechanical control (and vice versa) is cumbersome and lacks speed and safeguards to ensure safety and reliability.

Accordingly, there is a need for a SbW system that can utilize both electrical and mechanical connections for added safety and functionality. The improved system should be adaptable for use in a single or double chassis track vehicle and should overcome the limitations of conventional designs. It should allow seamless transition between mechanical and electric steering while the vehicle is moving with safeguards for improved reliability and safety.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking into consideration the entire specification, claims, drawings, and abstract as a whole.

Embodiments of the disclosure include an improved steering system for a track vehicle that uses "hybrid" SbW technology. The system incorporates a hydro-mechanical steering system and an electronic steering (SbW) system that function concurrently with each other. This allows instantaneous and "seamless" transition between systems while the vehicle is moving. The system is compatible with a single or double chassis track vehicle.

The system is comprised of one or more mechanical connections to a hydro-mechanical steering unit and one or more electronic connections to electro-hydraulic control valves. A steering pump displacement control unit can control output to a right track and a left track from simultaneous inputs from the hydro-mechanical steering unit and the electro-hydraulic control valves.

The electronic connections can include one or more steering input sensors, one or more electro-hydraulic control valves and a transmission control module. A voting strategy is used in determining the validity of input from the steering input sensors. The mechanical connections can include a steering yoke and a hydro-mechanical steering unit. The steering system can operate in a closed loop feedback. Further, the steering input sensors can be controlled through autonomous driving control.

Embodiments also include a steering system for a track vehicle comprised of an electronic steering system, a hydro-mechanical steering system and a steering pump displacement control unit. The steering pump displacement control unit receives simultaneous inputs from the electronic steering system and the hydro-mechanical steering system and varies output to a right and left track of the track vehicle.

Embodiments also include a steering system for a double (dual) chassis track vehicle comprised of an electronic steering system and a hydro-mechanical steering system. An articulation unit directs a second chassis from simultaneous inputs from the electronic steering system and the hydro-mechanical steering system. The electronic steering system and the hydro-mechanical steering system can function by controlling steer cylinders of the articulation unit.

The electronic steering system for the double chassis track vehicle can include one or more steering input sensors, one or more electro-hydraulic control valves and a steer by wire controller. The hydro-mechanical steering system can include a steering yoke and a hydro-mechanical steering unit. The steering system can operate in a closed loop feedback.

A first aspect of the disclosure is a steering system for a track vehicle that incorporates hydro-mechanical steering and electronic steering (SbW) systems that function concurrently with each other.

A second aspect of the disclosure is a steering system that allows seamless transition between mechanical control and electronic (SbW) control.

A third aspect of the disclosure is a steering system that allows seamless transition between hydro-mechanical steering and electronic (SbW) steering of a moving track vehicle with safeguards for improved reliability and safety.

A fourth aspect of the disclosure is a SbW system that is adaptable for autonomous driving of a track vehicle.

A fifth aspect of the disclosure is a steering system for use in a double chassis track vehicle wherein steering is controlled by an articulation unit.

BRIEF DESCRIPTION OF FIGURES

The drawings described herein are for illustrative purposes only of selected embodiments and not all possible implementations, and are not intended to limit the scope of the present disclosure.

The summary above, as well as the following detailed description of illustrative embodiments, is better understood when read in conjunction with the appended drawings. For the purpose of illustrating the disclosure, exemplary constructions of the disclosure are shown in the drawings. However, the disclosure is not limited to specific methods and instrumentalities disclosed herein. Moreover, the drawings are not to scale.

DETAILED DESCRIPTION

Figure 1:
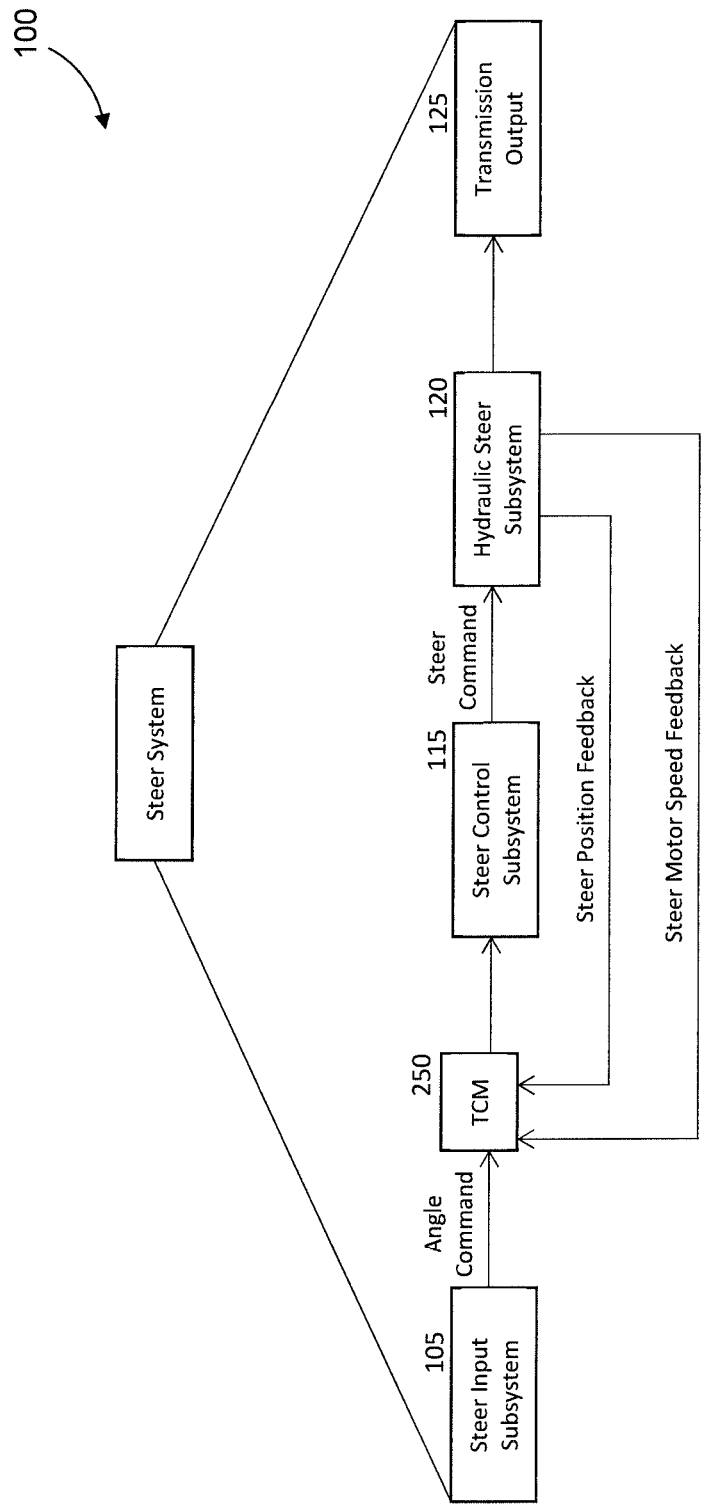
FIG. 1 is a steering control block diagram for a track vehicle, according to one aspect of the disclosure.

While the disclosure is primarily described for the use in track vehicles, it can be modified for use in conventional vehicles (i.e. non-track vehicles) to gain the advantages of SbW technology. Other applications include, for example, using the disclosure in wheeled vehicles such as utility vehicles and tractor trailer vehicles, truck, lorry, bus, van, SUV (sport utility vehicle), ATV (all-terrain vehicle), hovercraft, boat, ship or military vehicles such as landing craft and tanks. Further, the disclosure can also be used in autonomous vehicles, for example, to allow steering control to be switched between manual (human driven) and autonomous (computer driven).

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments in this specification and the appended claims, and are not necessarily intended to be construed as limiting.

As applicable, the terms "about" or "generally", as used herein in the specification and appended claims, and unless otherwise indicated, means a margin of +/−20%. Also, as applicable, the term "substantially" as used herein in the specification and appended claims, unless otherwise indicated, means a margin of +/−10%. It is to be appreciated that not all uses of the above terms are quantifiable such that the referenced ranges can be applied.

The term "analog" or "analog signal" refers to any continuous signal for which the time varying feature (variable) of the signal is a representation of some other time varying quantity (i.e. analogous to another time varying signal).

The term "articulated track vehicle" refers to a vehicle which has a permanent or semi-permanent pivot joint that is linked to a trailing vehicle. Steering is achieved by articulation of the two bodies about the pivot point. Whereas a single chassis tracked vehicle is steered by varying the speeds of the left and right tracks.

The term "autonomous vehicle" or "autonomous car" refers to a vehicle that is capable of monitoring its environment and navigating without human input. Autonomous vehicles typically use sensors (e.g. CMOS cameras, radar and laser light) to monitor their location and their environment.

The term "closed loop feedback," "closed loop control system" or "feedback control system" is a control system which uses the concept of an open loop system as its forward path but has one or more feedback loops or paths between its output and its input. A closed loop control system can consider the current output and alter it to a desired condition based on the corresponding input.

The term "controller" refers to a comparative device that receives an input signal from a measured process variable, compares this value with that of a predetermined control point value (set point), and determines the appropriate amount of output signal required by the final control element to provide corrective action within a control loop. An electronic controller uses electronic signals and digital algorithms to perform its receptive, comparative and corrective functions.

The term "Controller Area Network," "CAN" or "CAN-bus" refers to a vehicle bus standard designed to allow microcontrollers and devices to communicate with each other in applications without a host computer.

The term "hack" refers to an unauthorized access and manipulation of a computer system or network.

The term "Steer by Wire" or "SbW" refers to a system that provides steering control of a vehicle without mechanical components/linkages between the steering wheel and the steering mechanism. The control of the steering direction is established through steering mechanisms that are actuated by electronic control units monitoring the steering wheel inputs from the driver. In a single chassis track vehicle, steering is achieved by electronically varying the speeds of the left and right outputs, whereas in a double chassis track vehicle, steering is achieved electronically by articulating the two bodies of the vehicle about the pivot point.

The term "steering system" refers to a collection of components used to steer a vehicle. In a track vehicle, steering involves vary output to left and right tracks.

The term "track vehicle" or "full-track vehicle" refers to a vehicle such as a tank that is supported, driven and steered by a tank/caterpillar tread.

The term "voting strategy" refers to a comparison of electrical input signals (steering) for validity of the driver's input, wherein if two out of three signals disagree, the system will flag a fault.

Other technical terms used herein have their ordinary meaning in the art that they are used, as exemplified by a variety of technical dictionaries. The particular values and configurations discussed in these non-limiting examples can be varied and are cited merely to illustrate at least one embodiment and are not intended to limit the scope thereof.

Embodiments of the disclosure include a steering system for a track vehicle with hybrid SbW functionality. The system incorporates hydro-mechanical steering control with electronic (SbW) control. The system utilizes redundant components for the SbW functions to maintain a high level of safety and reliability. The system can instantaneously and seamlessly transition to hydro-mechanical steering in the event of electronic control (SbW) or electrical power failure. Likewise, the system can instantaneously and seamlessly transition to electronic (SbW) steering in the event of a hydro-mechanical failure. Further, the system can be used for autonomous driving.

Conventional track vehicles typically use mechanical components for mobility operation including steering. Differential steering is a means of steering by applying more or less drive torque to one side of the vehicle than the other. Electronic steering (SbW) offers benefits over mechanical steering systems. SbW provides steering control without mechanical components/linkages between the steering input (e.g. steering wheel) and the steering mechanism. In a wheeled vehicle, control of the wheels' direction is established through electric motor(s) that are actuated by electronic control units monitoring the steering wheel inputs from the driver. In a track vehicle, steering is achieved by varying the speeds of the left and right outputs via electronic inputs.

For a single chassis track vehicle, when a driver turns the steering wheel, several computer modules (some of them are redundant to ensure safety) control electro-hydraulic valves that control the hydraulic steer pump/motor to vary the speeds of the left and right outputs. The disclosure recognizes the benefit of a hybrid steering system that can utilize both mechanical and electronic control of steering. However, there are challenges to design and safety when including more than one set of controls. There is an obvious danger to any loss of steering control or delayed transfer of steering control. The system described herein includes a hybrid steering system that allows a hydro-mechanical system to operate simultaneously with an electronically controlled (SbW) steering system. A transition between mechanical and electronic control (and vice versa) is instantaneous and seamless.

FIG. 1 depicts an overview of the steer system 100 and subsystems, according to one embodiment of the disclosure. A track vehicle is steered through a series of subsystems that coordinate rotation of the left and right tread. A driver uses angle command from a steer input subsystem 105 such as a steering yoke. This can be a steering wheel or similar control. The transmission control module (TCM) 250 ultimately steers the vehicle through the transmission outputs 125. A steer control subsystem 115 is linked to a hydraulic steer subsystem 120. The hydraulic steer subsystem 120 gives steer position feedback and steer motor speed feedback to the TCM 250. A hybrid steering system allows both mechanical and electronic control of steering.

Mechanical Steering

Figure 2A:
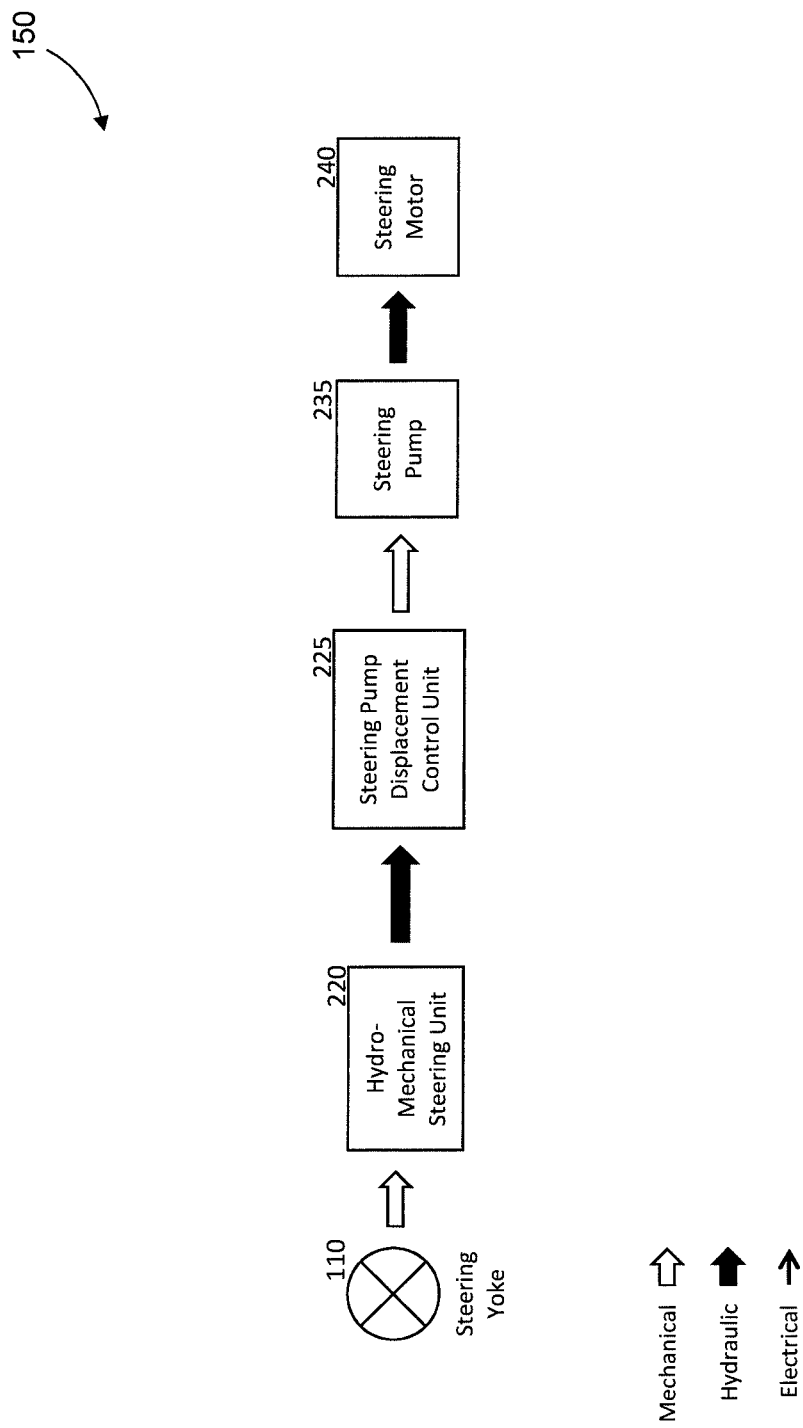
FIG. 2A depicts the operation of the mechanical components of the steering control system, according to one aspect of the disclosure.

FIG. 2A depicts the operation of the mechanical components of the steering control system 150, according to one embodiment of the disclosure. Mechanical connections are depicted as hollow arrows. Hydraulic connections are depicted as solid arrows. Electronic connections are depicted as thin (line) arrows.

When the driver actuates the steering yoke 110, connected to a hydro-mechanical steering Unit (HMSU) 220, the HMSU 220 will supply 100% of the control flow to the steering pump displacement control unit 225. The steering pump displacement control unit 225 is mechanically connected to the steering pump 235 and controls the displacement of the pump. The steering pump 235 in turn causes the steering motor 240 to rotate and vary the speeds of the left and right outputs.

Electronic Steering

Figure 2B:
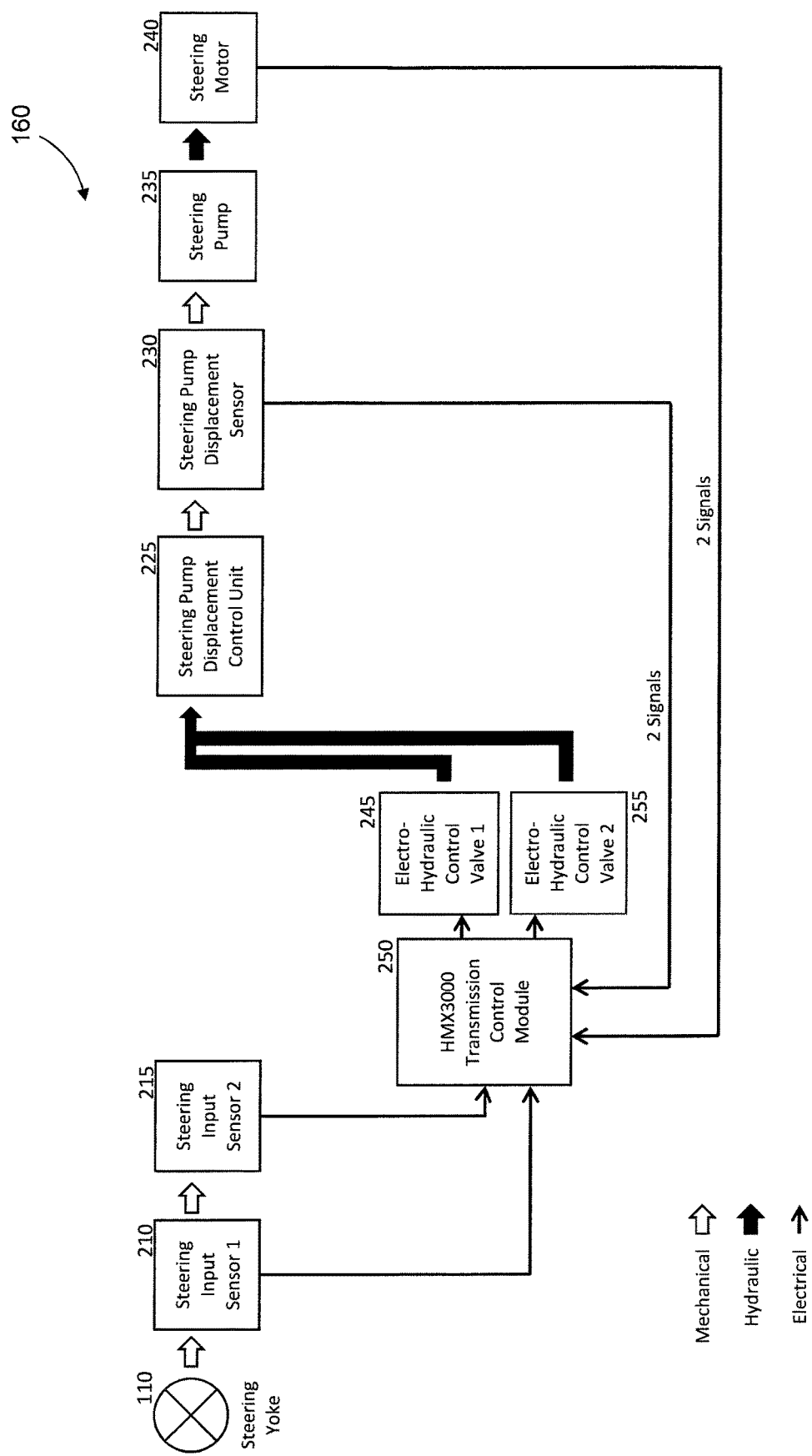
FIG. 2B depicts the operation of the electronic components of the steering control system, according to one aspect of the disclosure.

FIG. 2B depicts the operation of the electronic components of the steering control system 160, according to one embodiment of the disclosure. When the steering yoke 110 is rotated, rotary sensors within the respective sensor assemblies (210, 215) send corresponding signals to the Transmission Control Module (TCM) 250. The signals from the steering input sensors (210, 215) are interpreted by the transmission control module (TCM) 250 as steer input from the driver and a voting strategy is used in determining the validity of the inputs. A first and second electro-hydraulic control valve (245, 255) have hydraulic connections to the steering pump displacement control unit 225.

Feedback includes two independent signals from the steer pump displacement sensor 230 that relay steer pump position feedback to the TCM 250. Two independent signals from the steering motor 240 relay steer motor speed feedback to the TCM 250.

This provides accurate and reliable steering pump 235 displacement control. The steering pump displacement control unit 225 is mechanically connected to the steering pump 235 and will control the displacement of the pump. The steering pump 235 in turn causes the steering motor 240 to rotate and vary the speeds of the left and right outputs.

Hybrid Steering

Figure 2C:
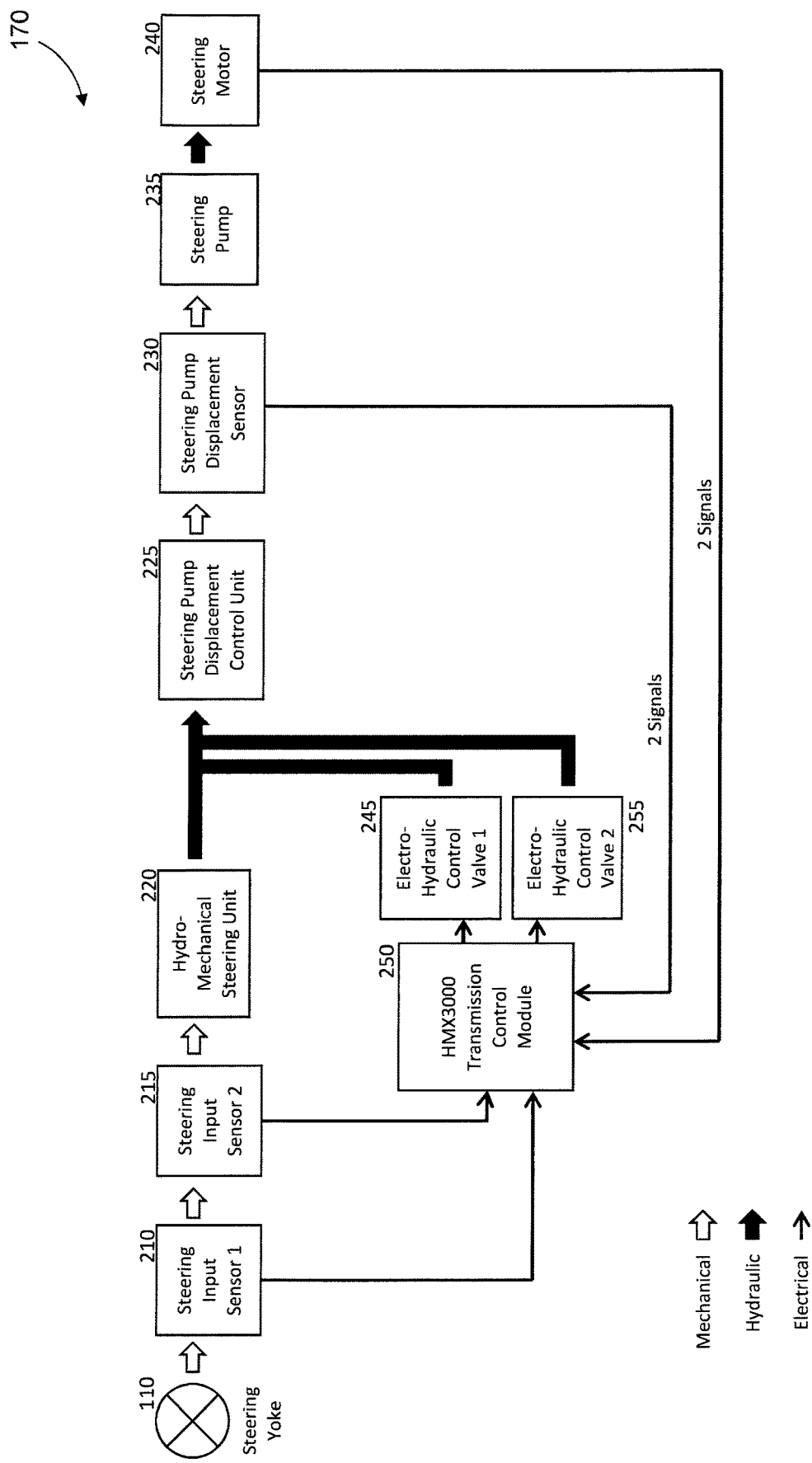
FIG. 2C depicts the contemporaneous operation of the mechanical and electronic components of the steering control system, according to one aspect of the disclosure.

FIG. 2C depicts the simultaneous operation of the mechanical and electronic components of the steering control system 170, according to one embodiment of the disclosure. Driver steering utilizes a hybrid steering control system in which steering can be achieved through hydro-mechanical input or electronic input to the steering pump displacement control unit 225. The hydro-mechanical input and electronic input operate in parallel with each other.

The steering yoke 110 maintains hydro-mechanical connections with the Steering Pump Displacement Control Unit 225. The steering yoke 110 is connected to a hydro-mechanical steering Unit (HMSU) 220. The HMSU 220 is hydraulically connected to steering pump displacement control unit 225. The steering pump displacement control unit 225 is mechanically connected to the steering pump 235 and controls the displacement of the pump. This ensures that in the event of an electronic (SbW) failure, steering control will remain available.

The steering yoke 110 also maintains control of the Steering Pump Displacement Control Unit 225 through electronic connections. The steering yoke activates rotary sensors within the respective sensor assemblies (210, 215) that send corresponding signals to the Transmission Control Module (TCM) 250. Two electro-hydraulic control valves (245, 255) are connected hydraulically to the steering pump displacement control unit 225. In the event of mechanical failure of the steering yoke 110 or HMSU 220, steering control will remain available via electronic control.

Steering can be controlled via a closed loop feedback system. The steering pump displacement sensor 230 and the steering motor 240 can provide feedback to the transmission control module 250 using multiple signals. This ensures that the respective displacement of the steering pump is maintained during a steer for any given steer input from the steering yoke at any vehicle speed.

In another embodiment, the electronic system can be used for autonomous driving. Steering, as well as other mobility controls, can be controlled by sensors (e.g. CMOS cameras, radar and laser light) to monitor the location and surroundings of the vehicle. The SbW system is well suited to autonomous control because mechanical controls and linkages are not required. The vehicle can use different techniques to detect surroundings, such as radar, laser light, GPS, odometry and computer vision for autonomous driving. Advanced control systems can interpret sensory information to identify appropriate navigation paths, as well as obstacles and signage.

Double Chassis Vehicles

The system can be used with single and double (i.e. dual) chassis vehicles. For a double chassis vehicle, a second chassis unit trails the lead track vehicle and is connected via a pivot point (articulation unit) between the two units. The right and left tracks of the rear cabin can be powered. However, steering is achieved by controlling the angle of the articulation unit rather than varying the speeds of these tracks. The direction of travel of the dual chassis track vehicle relies on the control of the yaw angle between the front and rear cabins. Therefore, it is required that the yaw axis of rotation be powered by an active (powered) actuator/articulation unit.

Figure 3:
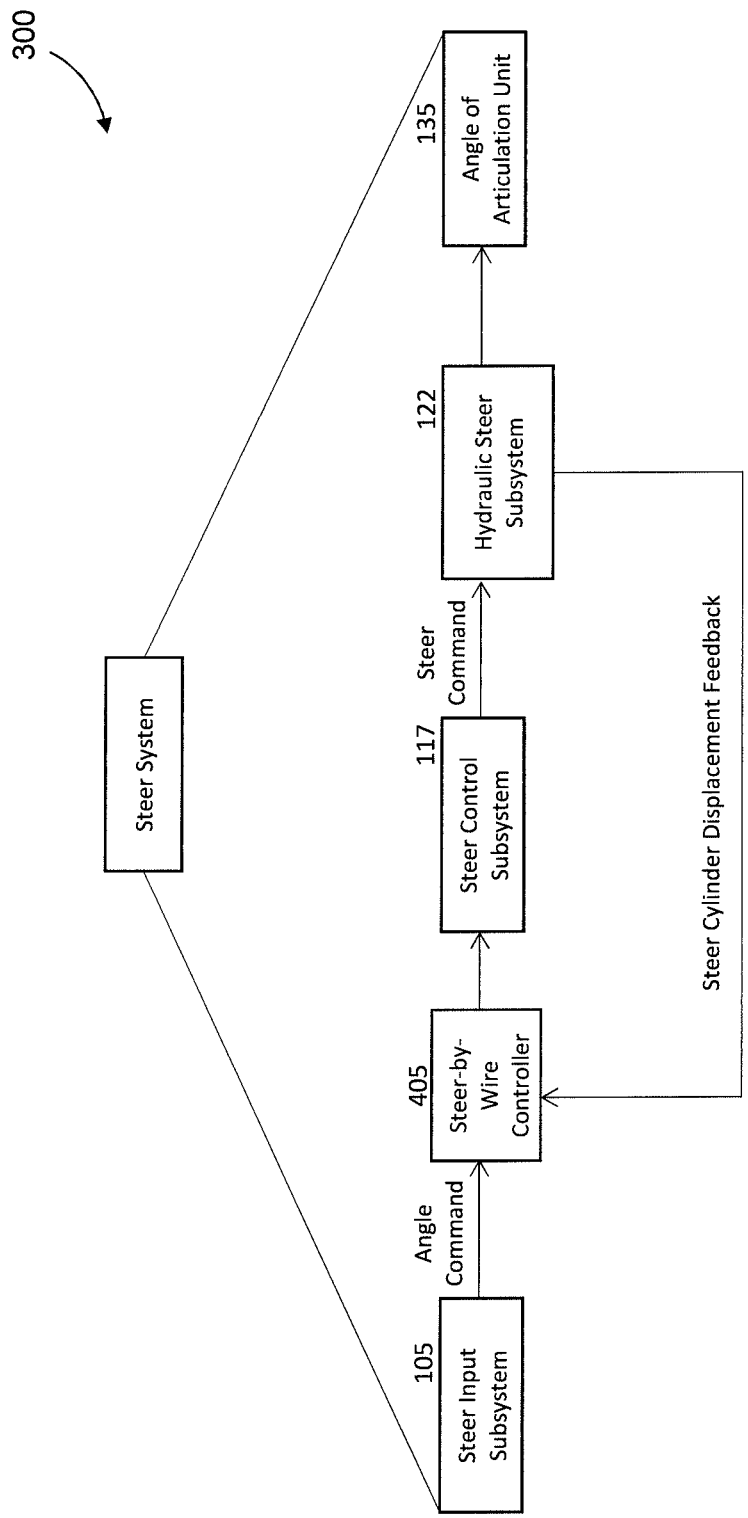
FIG. 3 is a steering control block diagram for a double chassis track vehicle, according to one aspect of the disclosure.

FIG. 3 depicts the components of the steer system for a double chassis vehicle 300 and subsystems, according to one aspect of the disclosure. A driver uses angle command from a steer input subsystem 105. The steer-by-wire controller 405 ultimately steers the vehicle through variation of the extension of the steer cylinders of the articulation unit which will change the angle of the articulation unit 135. A steer control subsystem 117 is linked to a hydraulic steer subsystem 122. The hydraulic steer subsystem 120 gives steer cylinder displacement feedback to the steer-by-wire controller 405.

Mechanical Steering

Figure 4A:
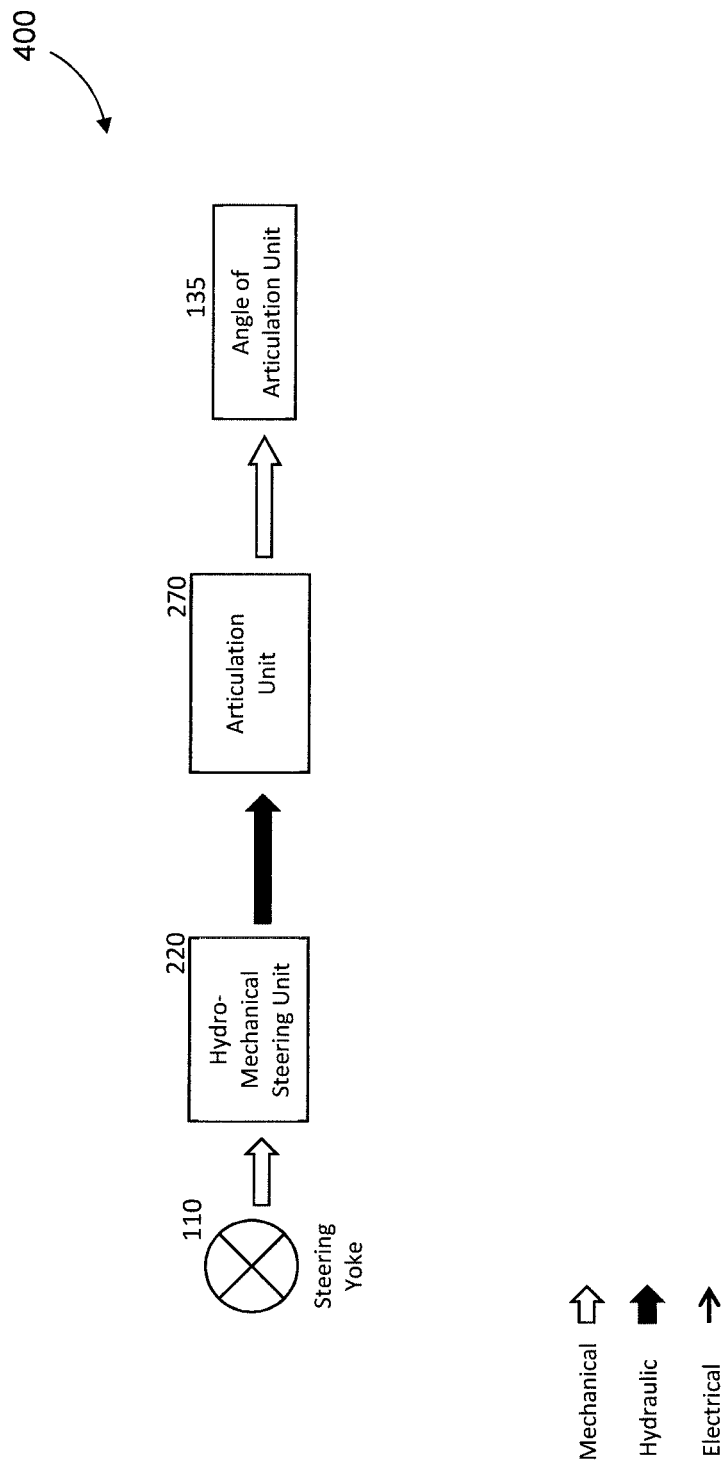
FIG. 4A depicts the operation of the mechanical components of the steering control system in a double chassis track vehicle, according to one aspect of the disclosure.

FIG. 4A depicts the operation of the mechanical components of the steering control system 400 in a double chassis track vehicle, according to one embodiment of the disclosure. Mechanical connections are depicted as hollow arrows. Hydraulic connections are depicted as solid arrows. Electronic connections are depicted as thin (line) arrows.

When the driver actuates the steering yoke 110, mechanically connected to a hydro-mechanical steering Unit (HMSU) 220, the HMSU 220 will hydraulically activate the articulation unit 270. The steer cylinders of the articulation unit 270 will mechanically vary the angle of the articulation unit 135.

Electronic Steering

Figure 4B:
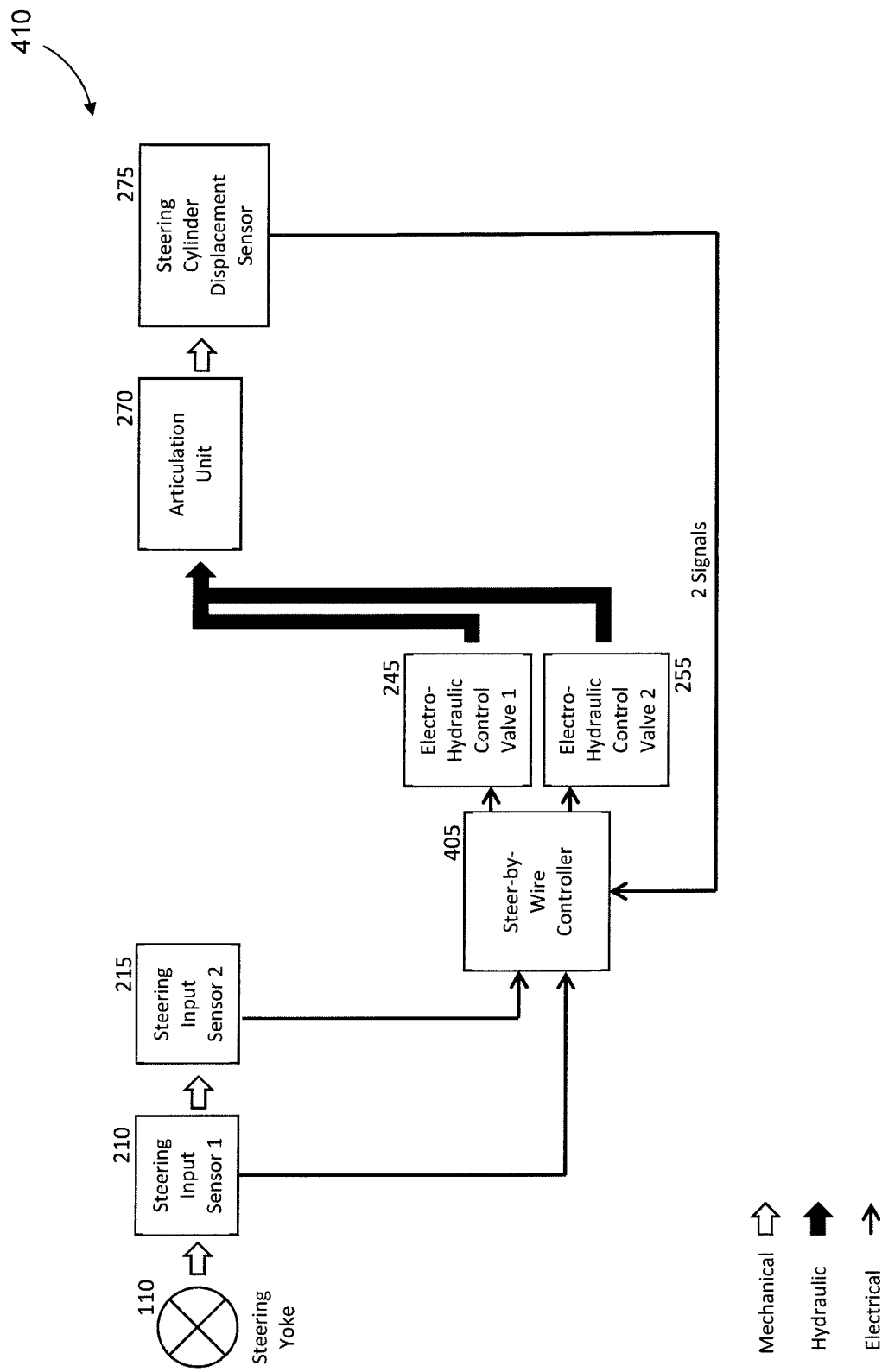
FIG. 4B depicts the operation of the electronic components of the steering control system in a double chassis track vehicle, according to one aspect of the disclosure.

FIG. 4B depicts the operation of the electronic components of the steering control system 410 in a double chassis track vehicle. When the steering yoke 110 is rotated, rotary sensors within the respective sensor assemblies (210, 215) send corresponding signals to the steer by wire controller 405. Two electro-hydraulic control valves (245, 255) are connected hydraulically to the articulation unit 270. The articulation unit 270 maintains mechanical connections to the steering cylinder displacement sensor 275. Two independent signals from the steering cylinder displacement sensor 275 relay feedback on the extension/retraction of the articulation unit to the steer by wire controller 405.

This provides accurate and reliable steering cylinder displacement sensor 275 control. The steering cylinder displacement sensor 275 provides feedback to the Steer by Wire Controller 405.

Hybrid Steering

Figure 4C:
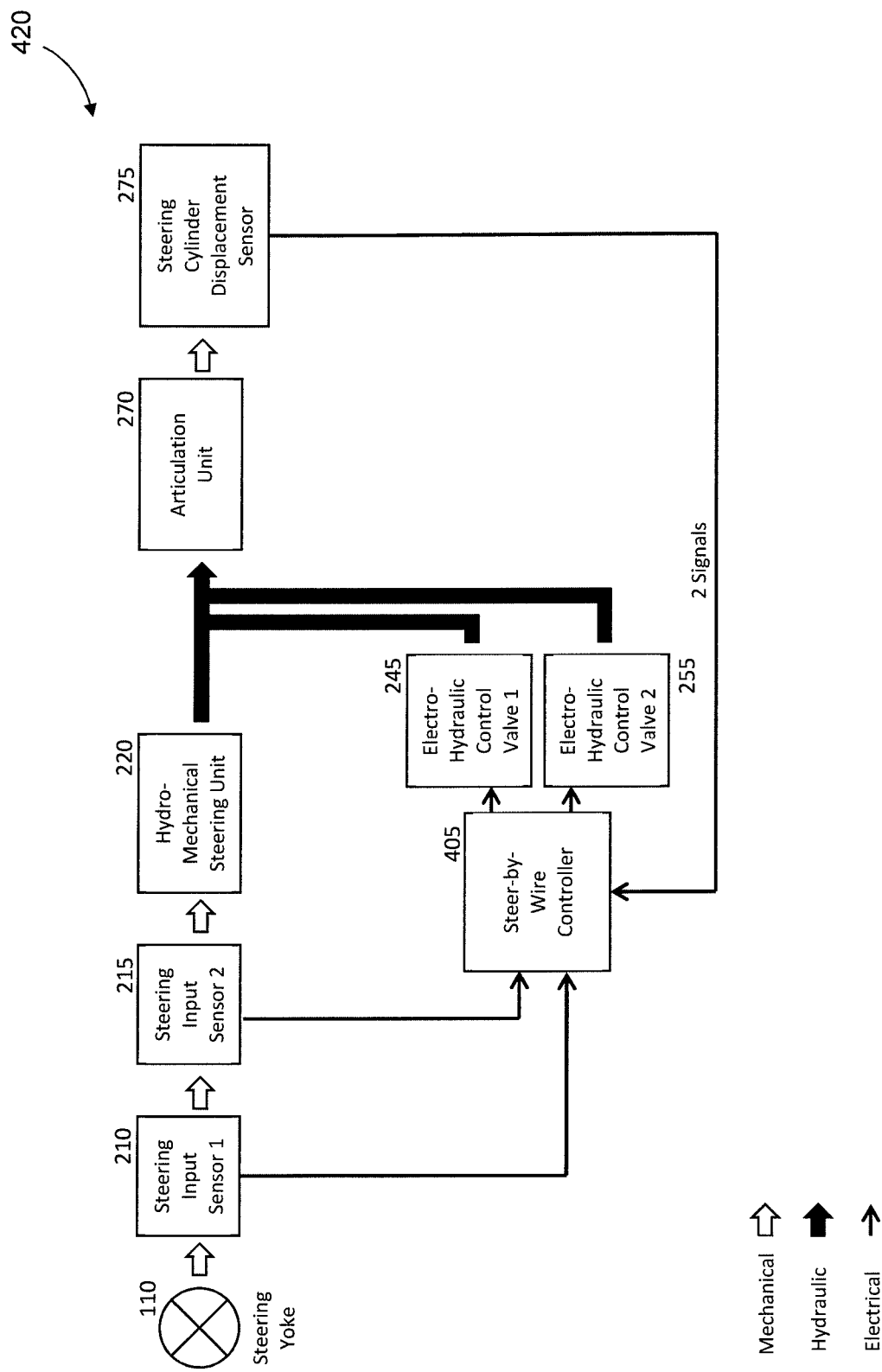
FIG. 4C depicts the contemporaneous operation of the mechanical and electronic components of the steering control system in a double chassis track vehicle, according to one aspect of the disclosure.

FIG. 4C depicts the simultaneous operation of the mechanical and electronic components of the steering control system 420 in a double chassis track vehicle. As with a single chassis track vehicle, driver steering utilizes a hybrid steering control system. Here, steering is achieved via hydro-mechanical input to the articulation unit 270 and electrical inputs to the steer by wire controller 405. The hydro-mechanical input and electronic input operate in parallel with each other.

The steering yoke 110 maintains hydro-mechanical connections with the articulation unit 270. The steering yoke 110 is connected to a hydro-mechanical steering Unit (HMSU) 220. The HMSU 220 is hydraulically connected to articulation unit 270 which is mechanically connected to the steering cylinder displacement unit 275. This ensures that in the event of an electronic (SbW) failure, steering control will remain available.

The steering yoke 110 also maintains control of the articulation unit 270 through electronic connections. The steering yoke activates rotary sensors within the respective sensor assemblies (210, 215) that send corresponding signals to the steer by wire controller 405. Two electro-hydraulic control valves (245, 255) are connected hydraulically to the articulation unit 270. In the event of mechanical failure, steering control will remain available via electronic control.

Steering can be controlled via a closed loop feedback system. The steering cylinder displacement sensor 275 can relay feedback to the steer by wire controller 405 through multiple signals. This ensures that the respective displacement of the steering pump is maintained during a steer for any given steer input from the steering yoke at any vehicle speed.

As with the single chassis track vehicle, this hybrid steering system ensures that in the event of mechanical failure of the steering yoke, HMSU or SbW (electrical) failure, steering control will remain available.

WORKING EXAMPLE

Use of Hybrid Steer by Wire System in a Double Chassis Track Vehicle

The system is well suited for use in a double chassis track vehicle. A hydro-mechanical steering system and an electronically controlled (SbW) steering system operate simultaneously. In this example, steering automatically reverts to hydro-mechanical control upon an electrical parts failure or vice versa.

A driver steers a double chassis track vehicle such as a tank. The lead vehicle (i.e. lead chassis) tows a trailing vehicle (i.e. second chassis) through an articulation unit 270. The vehicle is steered through the simultaneous operation of the mechanical and electronic components of the steering control system. A driver uses a steering yoke 110 to simultaneously control hydro-mechanical and electronic input to a steer by wire controller 405.

In normal operation, the driver turns the steering yoke 110 which is mechanically connected to the hydro-mechanical steering unit 220. Simultaneously, rotary sensors (210, 215) within the respective sensor assemblies send corresponding signals to the steer-by-wire controller 405 to the steer control sub-system 115.

Upon an electrical failure, steering can resume exclusively via hydro-mechanical control. For example, upon failure of an electro-hydraulic control valve (245, 255), the electronic steering system can be inoperable. However, the steering yoke 110 maintains a mechanical connection with the HMSU 220. This ensures that steering control will remain available. The driver maintains steering control of the vehicle with no loss of control.

Benefits of the hybrid SbW system design include:
It allows easy adaptation for autonomous driving. The SbW system architecture provides the fundamental system structure for autonomous steering. For example, a driver can elect to switch to autonomous control while maintaining his/her presence in the driving seat with access to the steering yoke.
It allows implementation of a SbW system without the safety concerns of SbW system failure as hydro-mechanical backup systems are in place.

It will be appreciated that variations of the above disclosed and other features and functions, or alternatives thereof, may be combined into other systems or applications. Also, various unforeseen or unanticipated alternatives, modifications, variations or improvements therein may be subsequently made by those skilled in the art which are also intended to be encompassed by the following claims.

Although embodiments of the current disclosure have been described comprehensively, in considerable detail to cover the possible aspects, those skilled in the art would recognize that other versions of the disclosure are also possible.

What is claimed is:

1. A steering system for a track vehicle comprising:
a mechanical connection to a hydro-mechanical steering unit;
an electronic connection from a transmission control module to an electro-hydraulic control valve;
a steering pump displacement control unit that controls output to a right track and a left track of the track vehicle from simultaneous inputs from the hydro-mechanical steering unit and the electro-hydraulic control valve,
wherein the hydro-mechanical steering unit and electro-hydraulic control valve are hydraulically connected to the steering pump displacement control unit;
a steering pump mechanically connected to the steering pump displacement control unit; and
a steering motor hydraulically connected to the steering pump for varying output to the left and right tracks of the vehicle.

2. The steering system of claim 1, further comprising an electronic connection from at least one a steering input sensor to the transmission control module.

3. The steering system of claim 2, wherein there are two or more of the steering input sensors and a voting strategy is used in determining the validity of input from the two or more steering input sensors.

4. The steering system of claim 1, wherein the mechanical connection comprises a steering yoke.

5. The steering system of claim 1, wherein the steering system operates in a closed loop feedback, wherein a steering pump displacement sensor mechanically connected to the steering pump displacement control unit and the steering motor provide feedback to the transmission control module using multiple signals, wherein the steering pump displacement sensor provides steer pump position feedback and the steering motor provides steer motor speed feedback.

6. The steering system of claim 1, wherein the electronic connection is controlled through autonomous driving control.

7. A steering system for a track vehicle comprised of:
an electronic steering system comprising a transmission control module with an electronic connections to a electro-hydraulic control valve,
a hydro-mechanical steering system, and
a steering pump displacement control unit that receives simultaneous inputs from the electronic steering system and the hydro-mechanical steering system, wherein the hydro-mechanical steering system and electronic steering system are hydraulically connected to the steering pump displacement control unit;
a steering pump mechanically connected to the steering pump displacement control unit; and
a steering motor hydraulically connected to the steering pump for varying the output to a right track and a left track of the track vehicle.

8. The steering system for a track vehicle of claim 7, wherein the electronic steering system comprises a steering input sensor.

9. The steering system for a track vehicle of claim 7, wherein the hydro-mechanical steering system is comprised of a steering yoke and a hydro-mechanical steering unit.

10. The steering system for a track vehicle of claim 7, wherein the steering system operates in a closed loop feedback, wherein a steering pump displacement sensor mechanically connected to the steering pump displacement control unit and the steering motor provide feedback to the transmission control module using multiple signals, wherein the steering pump displacement sensor provides steer pump position feedback and the steering motor provides steer motor speed feedback.

11. The steering system for a track vehicle of claim 7, wherein the electronic steering system is controlled through autonomous driving control.

12. The steering system for a track vehicle of claim 7, wherein the track vehicle comprises a double chassis with a second chassis trailing a lead chassis connected by an articulation unit that directs the second chassis from simultaneous inputs from the electronic steering system and the hydro-mechanical steering system of the lead chassis.

13. The steering system for a track vehicle of claim 12, wherein the electronic steering system and the hydro-mechanical steering system control steer cylinders of the articulation unit.

14. The steering system for a track vehicle of claim 12, wherein the electronic steering system is comprised of one or more steering input sensors.

15. The steering system for a track vehicle of claim 12, wherein the hydro-mechanical steering system is comprised of a steering yoke.

16. The steering system for a track vehicle of claim 12, wherein the electronic steering system operates in a closed loop feedback, wherein a steering pump displacement sensor mechanically connected to the steering pump displacement control unit and the steering motor provide feedback to the transmission control module using multiple signals, wherein the steering pump displacement sensor provides steer pump position feedback and the steering motor provides steer motor speed feedback.

* * * * *